UNITED STATES PATENT OFFICE.

HENRY LEIBERT, OF NORRISTOWN, PENNSYLVANIA.

IMPROVED COMPOSITION FOR GUNPOWDER.

Specification forming part of Letters Patent No. 37,296, dated January 6, 1863.

*To all whom it may concern:*

Be it known that I, HENRY LEIBERT, of Norristown, Montgomery county, Pennsylvania, have invented a compound or compounds to be used as a substitute for gunpowder; and I do hereby declare the following to be a full, clear, and exact description of the same.

My invention consists of a powder composed of prussiate of potash, chlorate of potash, nitrate of soda or its equivalent, sawdust or its equivalent, sulphate of soda, and sulphur or its equivalent, combined in the manner and in the proportions substantially as described hereinafter, the composition forming a strong and cheap gunpowder, which can be compounded with perfect safety, and which can be readily modified as regards the rapidity of its action.

In order to enable others to make my invention, I will now proceed to describe the manner of carrying it into effect.

Chlorate of potash, although a desirable substance for use in the manufacture of gunpowder, owing to its highly-explosive qualities when mixed with other substances, has been hitherto discarded on account of the danger in compounding the ingredients, of which it forms a part. I have found after repeated experiments that a strong, highly-explosive powder, quick in its action, can be produced by simply mixing together prussiate of potash and chlorate of potash, and that in compounding these substances as little danger is incurred as in the manufacture of ordinary gunpowder. The proportions of the two substances may be varied. The more chlorate of potash there may be in the compound the more sudden and quick will be the explosion, and the more prussiate of potash there may be in the composition the slower will be the action of the powder, although its power, when the explosion takes place, will not be diminished on account of the tardiness of its action. In other words, while an increased quantity of the prussiate of potash adds to the strength of the powder, an increased quantity of chlorate of potash adds to the rapidity of its action. Hence powders of different qualities can be readily manufactured by varying the proportions of the two ingredients. Although an available powder may be thus produced by mixing together chlorate and prussiate of potash, the cost of these substances render it necessary that other ingredients should be added, such as common sawdust, nitrate of soda or saltpeter, sulphate of soda, and sulphur.

The following presents an example of proportions of the several ingredients forming a composition which I have found in practice to be a strong and cheap powder adapted to blasting purposes: first, prussiate of potash, two pounds; second, chlorate of potash, one pound; third, nitrate of soda, saltpeter, or nitrate of ammonia or other nitrous oxides, ten pounds; fourth, sawdust or charcoal, four pounds; fifth, sulphate of soda, one pound; and, sixth, sulphur, four pounds. One pound of quicklime and two pounds of sal-ammoniac or liquid ammonia may be used to advantage in connection with the above ingredients.

The nitrate of soda or saltpeter, the sawdust or charcoal, and sulphur are used for producing the same effect, which they accomplish as ingredients in the composition of ordinary gunpowder. While the sal-ammoniac or liquid ammonia neutralizes the acidity of other ingredients, the sulphate of soda and quicklime, owing to their drying property neutralize the moisture-absorbing properties of the nitrate of soda.

In preparing the powder the prussiate of potash and chlorate of potash may be first dissolved in water and the other ingredients added, so as to produce a paste to be subsequently dried gradually and granulated, or the whole of the ingredients may be mixed together in a dry state.

The powder may be colored by mixing with the ingredients a small portion of sulphate of iron.

I claim as my invention and desire to secure by Letters Patent—

Prussiate of potash, chlorate of potash, nitrate of soda or its equivalent, sawdust or its equivalent, sulphate of soda, and sulphur or its equivalent, combined in the manner and in the proportions substantially as and for the purpose herein set forth.

In testimony whereof I have signed my name to this specification in the presence of two subscribing witnesses.

H. LEIBERT.

Witnesses:
HENRY HOWSON,
CHARLES HOWSON.